M. SMITH.
BELLOWS FOR MUSICAL INSTRUMENTS.

No. 7,947.  Patented Feb. 25, 1851.

UNITED STATES PATENT OFFICE.

MARVIN SMITH, OF NEW HAVEN, CONNECTICUT.

BELLOWS FOR MUSICAL INSTRUMENTS.

Specification of Letters Patent No. 7,947, dated February 25, 1851.

*To all whom it may concern:*

Be it known that I, MARVIN SMITH, of New Haven, county of New Haven, and State of Connecticut, have invented a new and useful Improvement in Seraphins, Melodions, and other Like Instruments; and I hereby declare that the following is a full and exact description.

My improvement consists principally in combining the reeds generally used in those and similar instruments with an elastic wind chest, made in such a manner, and of such materials as to be capable of expanding and contracting thereby dispensing with a part or all of the common bellows used in such like instruments.

Figure 1, in the accompanying drawings represents a section taken through the instrument from the front to the back, the lines a, a,—a, a, showing the upper and lower edge of the case containing the instrument. A, shows the front, and B, the back of the case. C, represents the finger key of the ordinary pianoforte or organ key board; D, the key frame upon which the keys are placed and arranged in the usual manner. E, represents the reed board in which the reeds are inserted. F, F, represent the interior of the wind chest, b, b, representing the front and back sides of the same. The reed board E, and the feeder board o, o, joined or connected at r, forms the upper side or top of the wind chest. The bottom or under side of the wind chest I make of gum elastic or other material having similar elastic properties, which I secure in an airtight manner to the lower edge of the sides of the wind chest b, b. The curve c, c, represents a section of the elastic bottom with the wind chest partially exhausted as hereinafter described.

G, Fig. 1, represents that part of the common bellows called the feeder, and is represented as raised up from the feeder board o, o. Said feeder is designed to be operated in any of the known modes, and if allowed to drop or pull down upon the board o, o, the air contained within it escapes through holes or openings made through the top of the feeder, which holes are represented at e, e, e, and are covered by a valve u. Said valve opening upward. If then the feeder be again raised to the position shown in the drawings the valve u, being closed, a portion of the air contained in the wind chest F, F, equal to the capacity of the feeder will be exhausted, or withdrawn therefrom through holes or openings made through the board o, o, which holes are represented at i, i, i, and covered by the valve v, said valve v, also opening upward. Whenever the upward movement of the feeder ceases, the valve v, falls upon, and covers the holes i, i, i, and prevents the return of the air from the feeder to the wind chest, and if there be a succession of motions of the feeder as above described a large portion of the air contained in the wind chest will be exhausted, and it is evident that the pressure of the atmosphere upon the under side, or upon the elastic bottom of the wind chest, will cause the bottom to expand and rise toward the board o, o, as shown by the curve c, c,—thereby diminishing the internal size of the wind chest, and more or less, as indicated by the curved dotted lines n, n, d, d, represent an aperture made in the reed board E, into which aperture the reed m, is inserted. w represents a pallet, or valve which covers said aperture on the under side of the reed board E, the pallet w, being pressed up against the reed board by the spring h. s, represents a pin fitted loosely so as to slip easily through the reed board E, and the key frame D, said pin resting upon the pallet w, and supporting the finger key C.

The operation of my improved instruments consists in causing a succession of motions to be given to the feeder, as before described whereby the air is partially exhausted from the wind chest. If then the finger key C, be pressed down, the pallet or valve w, is opened by means of the pin s, when a strong current of air rushes through the aperture d, d, from without toward the interior of the wind chest causing the reed m, to vibrate and produce a musical sound, the current of air being continued and the vibrations of the reed prolonged by the contractive force of the elastic bottom before described.

The strength of the current of air above referred to depends also upon the contractive force of the elastic bottom of the wind chest, and whenever it is found to be insufficient to produce as loud a tone or sound as is desired I attach to the stationary part of the wind chest any number of metallic or other springs in such convenient manner that said springs may bear upon the elastic bottom, by which means the strength of the current of air may be increased at pleasure. The last mentioned springs are represented at H, H, Figs. 2 and 3.

Figure 1:
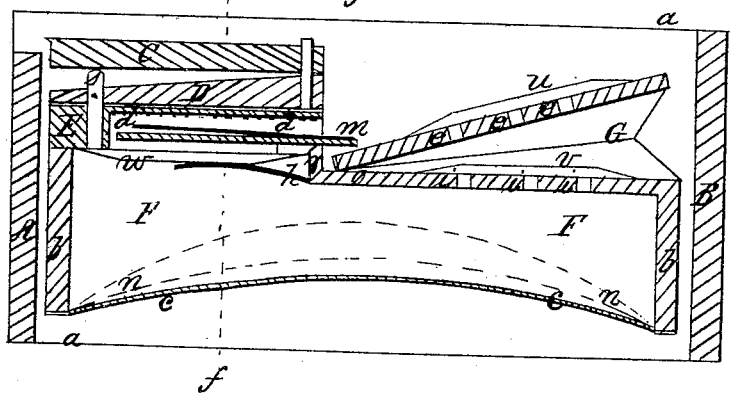
Figure 2:
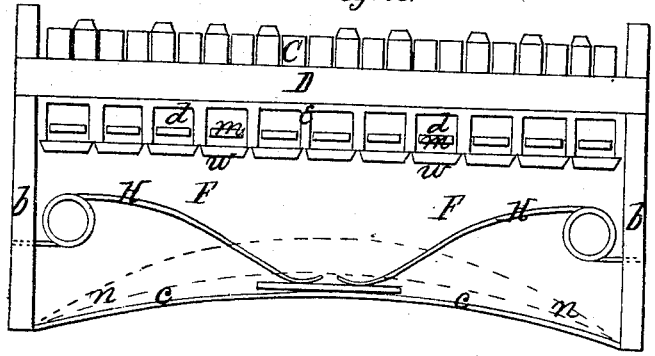
Fig. 2 is a longitudinal section, representing about one-half of the length of the instrument, taken at the dotted line $f$, in which C, represents the finger keys, D, the key frame, E, the reed board, $d, d$, the apertures in which the reeds are inserted, $m, m$, represent a section of the reeds, $w, w$, the pallets or valves covering the apertures $d, d$, on the under side of the reed board E.
Figure 3:
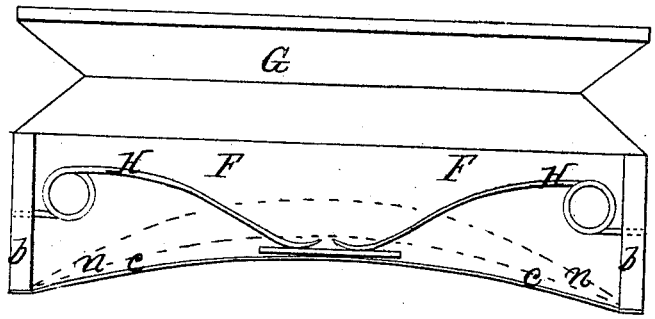
Fig. 3, represents the back side of the feeder raised up (as in Fig. 1) and also the interior of the wind chest F, F, the springs H, H, and a section of the elastic bottom by the curve $c, c$.

What I claim as my invention and desire to secure by Letters Patent is—

The method herein described, of making or constructing the wind chest commonly used in seraphins, melodeons and all similar musical instruments, with one or more sides made of gum elastic or other elastic material, and in such way and manner as to be capable of expanding and contracting, or, of being increased or diminished in size, and with the aid of metallic or other springs to answer all the purposes of the common bellows generally used in those and similar instruments, substantially as described.

MARVIN SMITH.

Witnesses:
M. PRESTON CASE,
HENRY W. BLANCHARD.